(12) United States Patent
Ikeda

(10) Patent No.: US 6,510,243 B1
(45) Date of Patent: Jan. 21, 2003

(54) IMAGE PROCESSING APPARATUS FOR MANAGING IMAGE DATA

(75) Inventor: Hiroaki Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,374

(22) Filed: Apr. 21, 1999

(30) Foreign Application Priority Data

Apr. 24, 1998 (JP) .............................................. 10-115470

(51) Int. Cl.[7] .................................................. G06K 9/34
(52) U.S. Cl. ............................. 382/173; 358/462; 707/6
(58) Field of Search ................................ 382/100, 112, 382/113, 173, 171, 175, 176–179, 181–187, 190, 195, 198, 199, 218, 229, 290, 292; 358/462; 707/514, 3, 517, 6

(56) References Cited

U.S. PATENT DOCUMENTS

| | | | | |
|---|---|---|---|---|
| 5,491,760 A | * | 2/1996 | Withgott et al. | 382/203 |
| 5,555,362 A | * | 9/1996 | Yamashita et al. | 382/173 |
| 5,588,072 A | * | 12/1996 | Wang | 382/176 |
| 5,613,019 A | * | 3/1997 | Altman et al. | 382/311 |
| 5,699,453 A | * | 12/1997 | Ozaki | 382/173 |
| 5,848,184 A | * | 12/1998 | Taylor et al. | 382/173 |
| 5,867,277 A | * | 2/1999 | Melen et al. | 358/296 |
| 5,889,886 A | * | 3/1999 | Mahoney | 382/176 |

* cited by examiner

Primary Examiner—Jayanti K. Patel
(74) Attorney, Agent, or Firm—Fitzpatrick, Cella, Harper & Scinto

(57) ABSTRACT

Image data is input via an image scanner. The input image data is segmented into regions with a predetermined size. The contents of the segmented regions are analyzed. Neighboring segmented regions are coupled if they have the same analysis contents. The attribute of a region group obtained after coupling is determined based on the analysis result. The image data is categorized into regions in units of attributes on the basis of the analysis and determination results, and regions in each category are managed together.

5 Claims, 6 Drawing Sheets

IMAGE PROCESSING APPARATUS FOR MANAGING IMAGE DATA

BACKGROUND OF THE INVENTION

The present invention relates to an image processing apparatus and method for managing a plurality of image data, and a computer readable memory.

Conventionally, an image processing apparatus such as an electronic filing system or the like, which saves and retrieves input images, stores input images and retrieval information such as keywords and the like in correspondence with each other. Upon search, a keyword is input, and if the input keyword matches a stored keyword, a corresponding input image is retrieved.

However, in this prior art, since the search range includes all registered keywords or all saved images, many unwanted images are output as matched images. For example, when images that contain graphs, tables, figures, and the like are to be retrieved, and a search is done using a word contained in their captions, if some registered keywords and saved text contain the word to be retrieved, all these images are retrieved. That is, more images than necessary are retrieved, and much time is required for retrieval.

When an image as a match is displayed on the screen, the entire image cannot normally be displayed on the screen, and the user must scroll the displayed image to see a graph or the like in that image. When the entire image is displayed within the screen, the image must be displayed in a reduced scale. For this reason, in order to grasp the details of a graph, figure, table, and the like, which require a high-resolution display in the displayed image, the user must display them in an enlarged scale. In any case, the operability is poor.

SUMMARY OF THE INVENTION

The present invention has been made in consideration of the aforementioned problems, and has as its object to provide an image processing apparatus and method, which retrieves image data having a region with at least a predetermined attribute in accordance with a designated query condition, can output that region alone as a retrieval result, and can improve operability upon retrieval, and a computer readable memory.

In order to achieve the above object, an image processing apparatus according to the present invention comprises the following arrangement.

That is, an image processing apparatus for managing a plurality of image data, comprises:
  input means for inputting image data;
  segmentation means for segmenting the image data input by the input means into regions with a predetermined size;
  analysis means for analyzing contents of the regions segmented by the segmentation means;
  coupling means for coupling neighboring ones of the regions segmented by the segmentation means if the regions have the same analysis contents obtained by the analysis means;
  determination means for determining an attribute of a region group obtained after the coupling means executes coupling is determined on the basis of an analysis result of the analysis means; and
  management means for categorizing the image data into regions in units of attributes on the basis of an analysis result of the analysis means and a determination result of the determination means, and managing regions in each category together.

In order to achieve the above object, an image processing apparatus according to the present invention comprises the following arrangement.

That is, an image processing apparatus for managing a plurality of image data, comprises:
  management means for managing the image data by categorizing the image data into regions in units of attributes;
  designation means for designating a word which serves as a query condition;
  extraction means for extracting a region having a predetermined attribute from the image data managed by the management means;
  matching means for matching the word designated by the designation means with characters in the region extracted by the extraction means; and
  output means for outputting image data having the region with the predetermined attribute on the basis of a matching result of the matching means.

In order to achieve the above object, an image processing method according to the present invention comprises the following arrangement.

That is, an image processing method for managing a plurality of image data, comprises:
  the input step of inputting image data;
  the segmentation step of segmenting the image data input in the input step into regions with a predetermined size;
  the analysis step of analyzing contents of the regions segmented in the segmentation step;
  the coupling step of coupling neighboring ones of the regions segmented in the segmentation step if the regions have the same analysis contents obtained in the analysis step;
  the determination step of determining an attribute of a region group obtained after coupling is executed in the coupling step is determined on the basis of an analysis result in the analysis step; and
  the management step of categorizing the image data into regions in units of attributes on the basis of an analysis result in the analysis step and a determination result in the determination step, and managing regions in each category together in a storage medium.

In order to achieve the above object, an image processing method according to the present invention comprises the following arrangement.

That is, an image processing method for managing a plurality of image data, comprises:
  the management step of managing the image data in a storage medium by categorizing the image data into regions in units of attributes;
  the designation step of designating a word which serves as a query condition;
  the extraction step of extracting a region having a predetermined attribute from the image data managed in the storage medium in the management step;
  the matching step of matching the word designated in the designation step with characters in the region extracted in the extraction step; and
  the output step of outputting image data having the region with the predetermined attribute on the basis of a matching result in the matching step.

In order to achieve the above object, a computer readable memory according to the present invention comprises the following arrangement.

That is, a computer readable memory that stores program codes of image processing for managing a plurality of image data, comprises:

a program code of the input step of inputting image data;
  a program code of the segmentation step of segmenting the image data input in the input step into regions with a predetermined size;
  a program code of the analysis step of analyzing contents of the regions segmented in the segmentation step;
  a program code of the coupling step of coupling neighboring ones of the regions segmented in the segmentation step if the regions have the same analysis contents obtained in the analysis step;
  a program code of the determination step of determining an attribute of a region group obtained after coupling is executed in the coupling step is determined on the basis of an analysis result in the analysis step; and
  a program code of the management step of categorizing the image data into regions in units of attributes on the basis of an analysis result in the analysis step and a determination result in the determination step, and managing regions in each category together in a storage medium.

In order to achieve the above object, a computer readable memory according to the present invention comprises the following arrangement.

That is, a computer readable memory that stores program codes of image processing for managing a plurality of image data, comprises:

a program code of the management step of managing the image data in a storage medium by categorizing the image data into regions in units of attributes;
  a program code of the designation step of designating a word which serves as a query condition;
  a program code of the extraction step of extracting a region having a predetermined attribute from the image data managed in the storage medium in the management step;
  a program code of the matching step of matching the word designated in the designation step with characters in the region extracted in the extraction step; and
  a program code of the output step of outputting image data having the region with the predetermined attribute on the basis of a matching result in the matching step.

As described above, according to the present invention, an image processing apparatus and method, which can retrieve image data having a region with at least a predetermined attribute in accordance with the designated query condition, can output that region alone as a retrieval result, and can improve operability upon retrieval, and a computer readable memory, can be provided.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described in detail hereinafter with reference to the accompanying drawings.

First Embodiment

Figure 1:
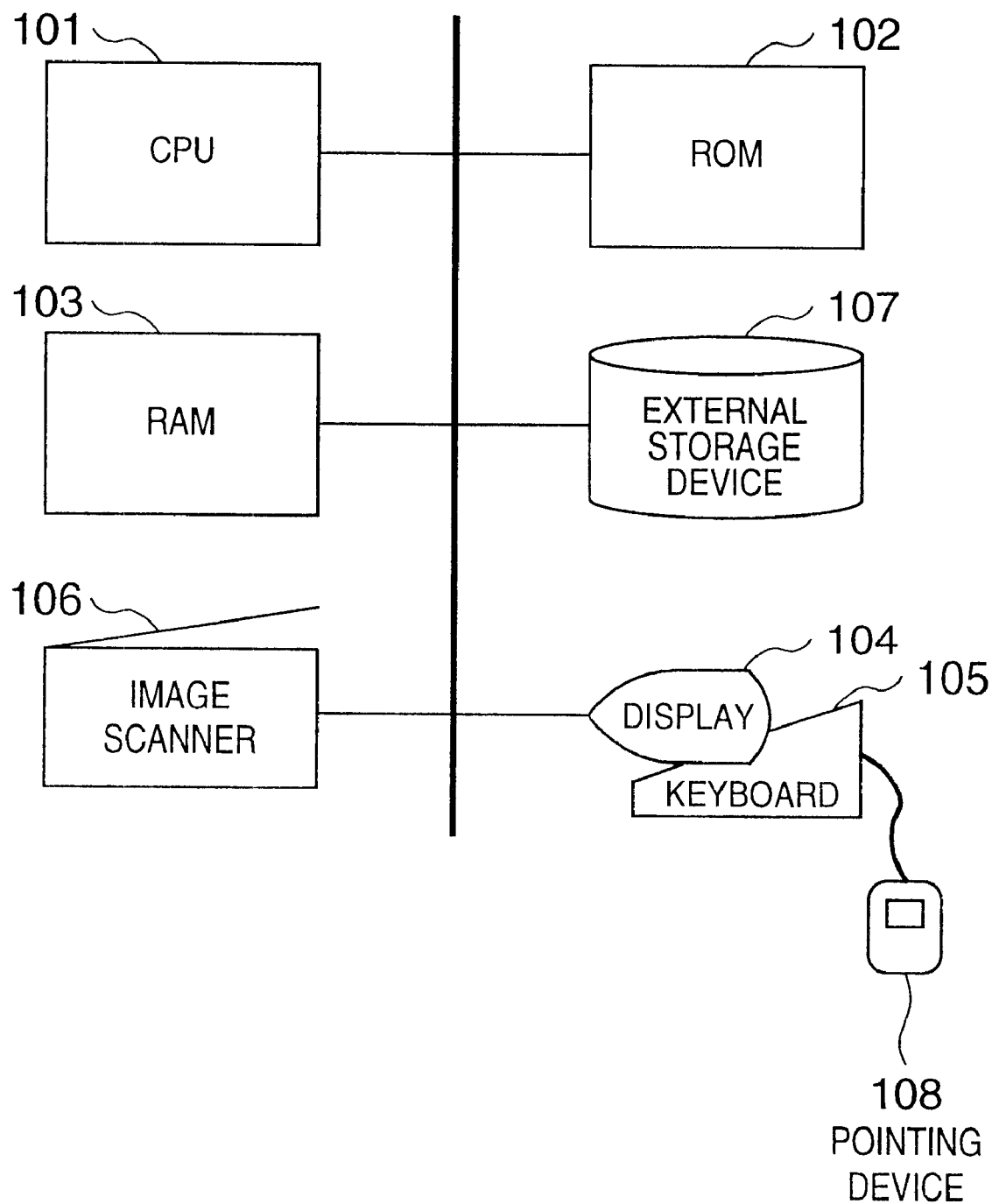
FIG. 1 is a block diagram showing the arrangement of an image processing apparatus according to the first embodiment of the present invention.

FIG. 1 is a block diagram showing the arrangement of an image processing apparatus according to the first embodiment of the present invention.

Referring to FIG. 1, reference numeral 101 denotes a CPU which controls the overall apparatus of this embodiment in accordance with a control program stored in a ROM 102. Reference numeral 102 denotes the ROM which stores the control program and the like for the apparatus of this embodiment, which implements the processes and the like shown in the flow charts (to be described later) executed by the CPU 101. Reference numeral 103 denotes a RAM which serves as a temporary saving area for various data, and stores document image data, and the like. Reference numeral 107 denotes an external storage device such as a magnetic disk. Reference numeral 104 denotes a display which displays image data and the like. Reference numeral 105 denotes a keyboard used for inputting various instructions. Reference numeral 108 denotes a pointing device such as a mouse, which is used for inputting various instructions like the keyboard 105. Reference numeral 106 denotes an image scanner for scanning an original image.

The processes executed in this embodiment will be explained below with reference to FIGS. 2 and 3.

Figure 2:
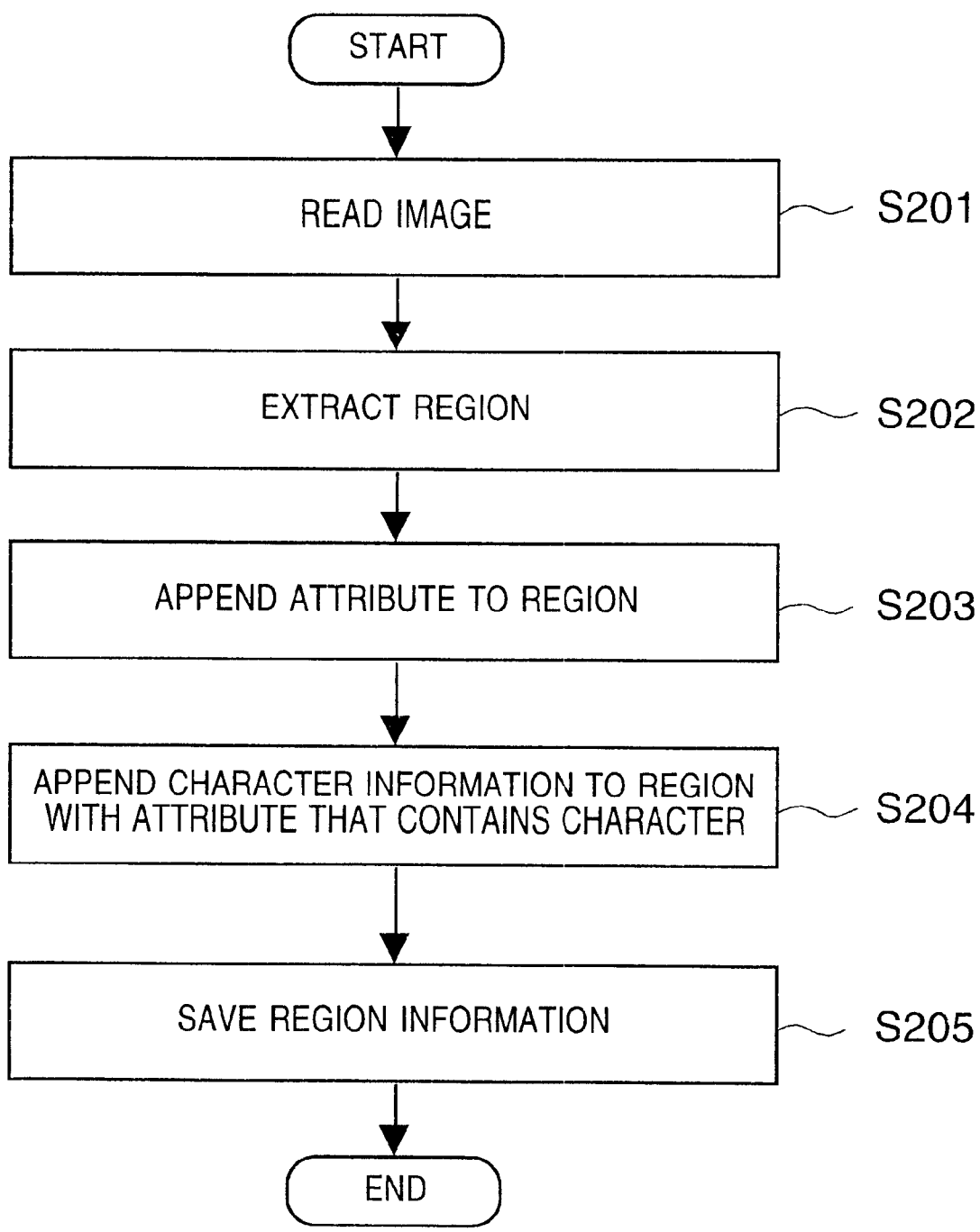
FIG. 2 is a flow chart showing the process for saving an original image input by the first embodiment of the present invention.

FIG. 2 is a flow chart showing the process for saving an input original image according to the first embodiment of the present invention.

Figure 4:
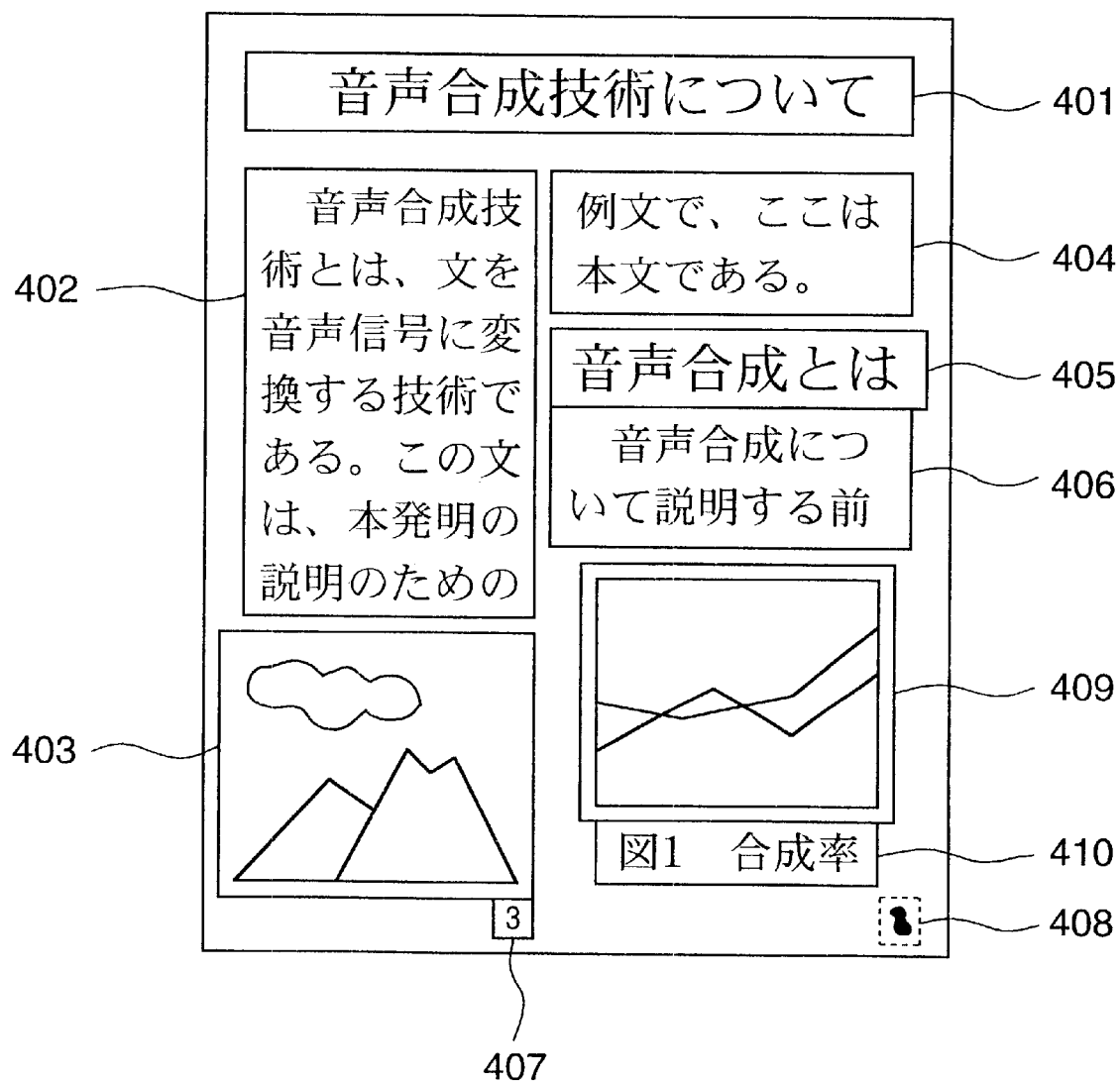
FIG. 4 shows an example of a region segmentation result according to the first embodiment of the present invention.

In step S201, an image is read via the image scanner 106. In step S202, regions are extracted from the input image. An example of the region extraction method will be explained. The input image is segmented in units of M×N pixels, and if each segmented region includes an image even for one pixel, it is determined that the region includes the image, and its decimated image is formed. Portions where decimated images are close by are combined to form a small rectangle. Rectangle which have a large aspect ratio, and whose short sides are close to each other are highly likely to form a character line. In such case, the rectangles are coupled. A group of rectangles whose short sides have nearly the same lengths, and which line up at nearly equal intervals are highly likely to be a text part and, hence, are coupled. As a result, regions 401 to 408 shown in FIG. 4 are extracted.

In step S203, attributes are appended in units of segmented regions. An example will be explained using FIG. 4. That is, since the region 402 is highly likely to be a text part and is formed by coupling a plurality of small rectangles, an attribute "text" is appended. Similarly, an attribute "text" is appended to the regions 404 and 406. As for the remaining regions, it is checked if each region contains characters. Especially in case of characters, since images periodically appear/disappear in a region, whether or not the region contains characters can be determined based on the presence/absence of such images. As a result, the regions 401, 405, 407, and 410 are determined as those containing characters (character regions).

On the other hand, as for other regions, if a region has a small size, it is determined as "noise". If a region has a small pixel density, an attribute "graph" is appended to that region. A region other than the aforementioned regions is determined to be an illustration or photograph, and an attribute "image" is appended. Furthermore, if a given character region is close to an upper or lower region appended with an attribute "graph", its attribute is determined to be "caption". On the other hand, if a given character region has a larger line width than that of a character line of a text part, and is located at a position different from the paragraph of the text part, its attribute is determined to be "heading". On the other hand, if a given character region has a line width larger than that of a character line of a text part, but has a width nearly equal to the paragraph width of the text part, its attribute is determined to be "subheading". Furthermore, if a given character region has a line width smaller than that of a character line of a text part, and is located at the lower or upper end portion of an original, its attribute is determined to be "page".

If a region appended with an attribute "image" is present closer to the upper or lower character region, its attribute is determined to be "figure/table". A region to which an attribute "caption" is appended is saved to be able to specify a region to which that "caption" is attached.

As a result, the region 401 is appended with an attribute "heading"; the region 405, "subheading"; the region 407, "page"; the region 410, "caption"; the region 409, "graph"; the region 403, "image"; and the region 408, "noise". When a given region is determined to be a character region but corresponds to none of "text", "heading", "subheading", "caption", and "page", an attribute "character" is appended.

In step S204, the regions appended with attributes "character", "text", "heading", "subheading", and "caption" undergo character recognition, and the recognition results are appended as character information to the input image. In step S205, information such as the positions, sizes, and the like of the extracted regions, the attributes of those regions, and character information if the regions have such information are saved in the external storage device 107.

By repeating these operations, an image input via the image scanner 106 is stored in the external storage device 107. At this time, since the input image and information that pertains to the input image are stored in association with each other, the input image can be obtained when it is necessary.

Note that images within the regions may be extracted from the input image, and may be stored in association with the individual rectangular regions. Also, as for a region appended with an attribute "graph", data which can reproduce a graph and is expressed in a predetermined format may be stored in association with that region. For other regions as well, information to be stored in association with the regions is not limited to those in the first embodiment.

The process for retrieving image data when the image data search range is limited to images appended with an attribute "caption" will be explained below with reference to FIG. 3.

Figure 3:
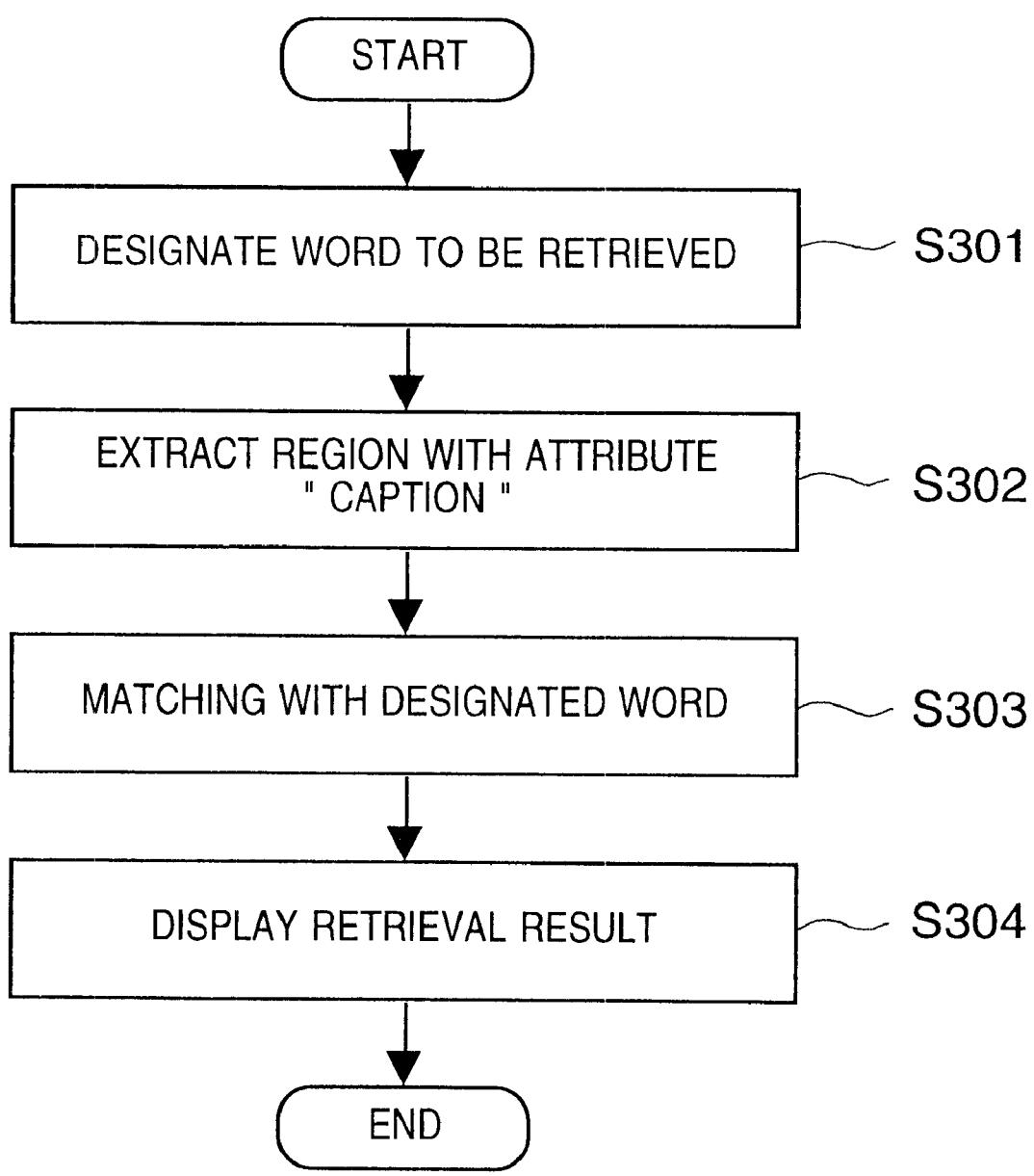
FIG. 3 is a flow chart showing the process for retrieving image data according to the first embodiment of the present invention.

FIG. 3 is a flow chart showing the process for retrieving image data according to the first embodiment of the present invention.

In step S301, a word that serves as a retrive criteria is designated. Such designation may be attained by input operation of the operator on the display 104 or may be attained by switching the attribute constraint. In step S302, region information of image data appended with an attribute "caption" is extracted from image data to be retrived. In step S303, the designated word is matched with character information contained in the extracted region information. In step S304, a list of image data having region information which resulted in successful matching are displayed as retrieval results or matches.

In the aforementioned search process, retrieval of image data appended with an attribute "caption" has been exemplified. However, the present invention is not limited to such specific retrieval. For example, image data appended with other predetermined attributes such as "figure/table", "graph", and the like can be retrieved.

As described above, according to the first embodiment, regions are extracted from image data in units of attributes, and caption determination and extraction of information such as character information or the like are automatically done in correspondence with the extracted attributes. For this reason, image data can be easily saved, and image data to be searched can be managed in units of attributes. Hence, image data can be retrieved in units of attributes. That is, since a retrive criteria for an attribute can be designated, all saved image data need not be searched, and unwanted image data can be prevented from being retrieved.

Note that an original image to be saved need not always be scanned by the image scanner 106, but data prestored in the external storage device 107 or the like may be used. The extracted region information may be stored in the RAM 103. Furthermore, such information may be stored in a storage device at a remote place using a communication means.

Moreover, the region information to be saved may be arbitrarily edited or modified by the user.

In addition, the processes described in the first embodiment may be supplied by means of a program, and that program may be executed by the CPU 101.

Also, the region extraction method from image data, and the attribute appending method that have been described with the aid of the flow chart in FIG. 2 are not limited to those described above as long as the same effects as described above can be obtained.

Second Embodiment

In the second embodiment, another example of the process for retrieving image data will be explained using FIG. 5.

Note that the process for saving an original image is the same as that in the first embodiment, and a detailed description thereof will be omitted.

Figure 5:
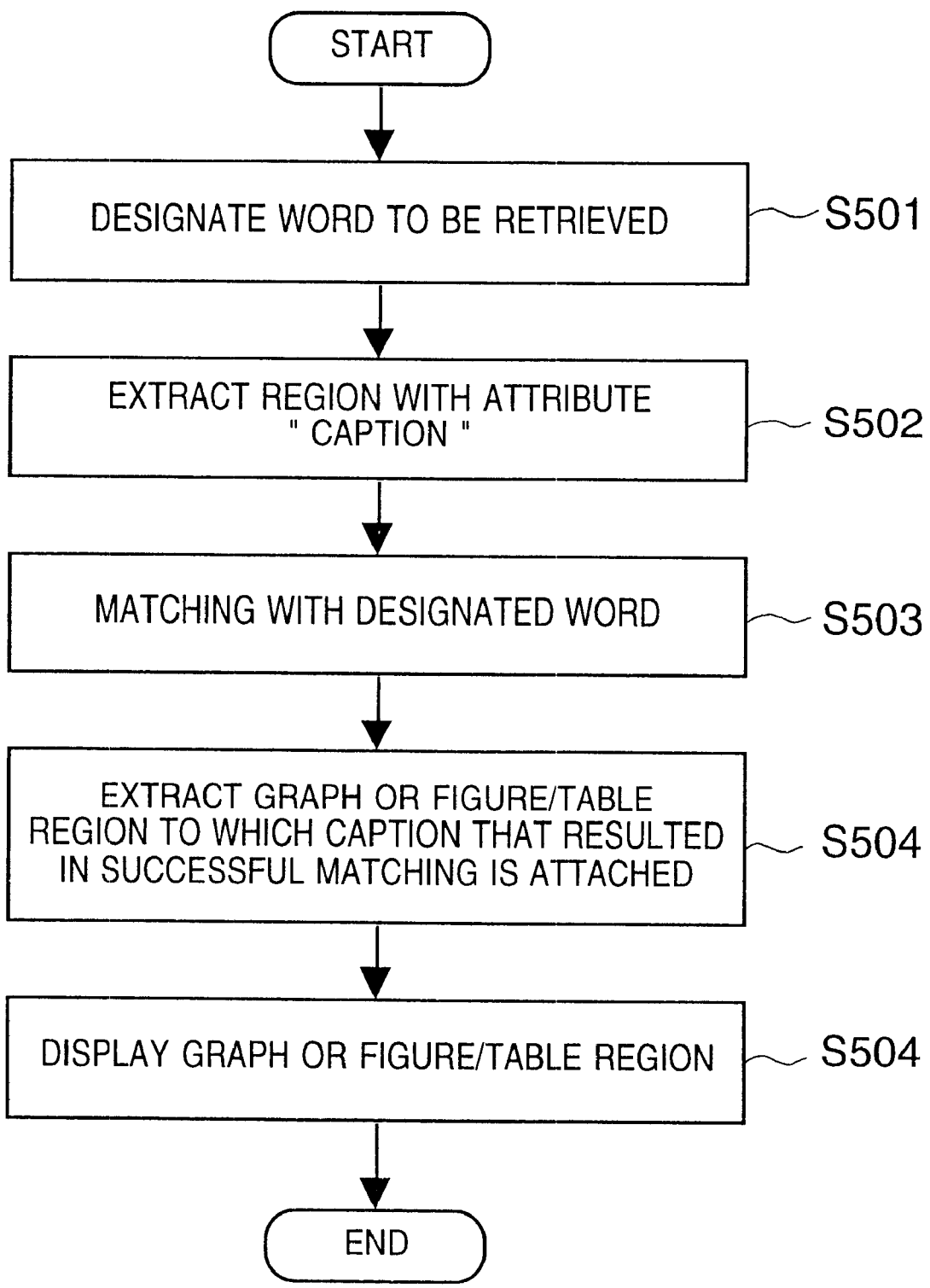
FIG. 5 is a flow chart showing the process for retrieving image data according to the second embodiment of the present invention.

FIG. 5 is a flow chart showing the process for retrieving image data according to the second embodiment of the present invention.

In step S501, a word that serves as a retrive criteria is designated. In step S502, region information of image data appended with an attribute "caption" is extracted from image data to be retrived. In step S503, the designated word is matched with character information contained in the extracted region information. In step S504, region information of image data appended with an attribute "figure/table"

or "graph" which is attached to the region information that resulted in successful matching is extracted. In step S505, a region appended with an attribute "figure/table" or "graph" is displayed on the display 104 on the basis of the extracted region information. At this time, image data appended with an attribute "caption" which is attached to the displayed region may be simultaneously displayed. Upon displaying the region on the display 104, when image data is saved, a region appended with an attribute "figure/table" or "graph" is extracted on the basis of the position information and size information of the region of that saved image data. Alternatively, image data saved in association with regions in units of attributes may be used.

As described above, according to the second embodiment, since a graph or figure/table alone contained in the saved image data is displayed as a retrieval result, the user can easily determine if the retrieved image data is the required one, and operation for displaying a graph or the like in an easy-to-see state can be facilitated.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 6:
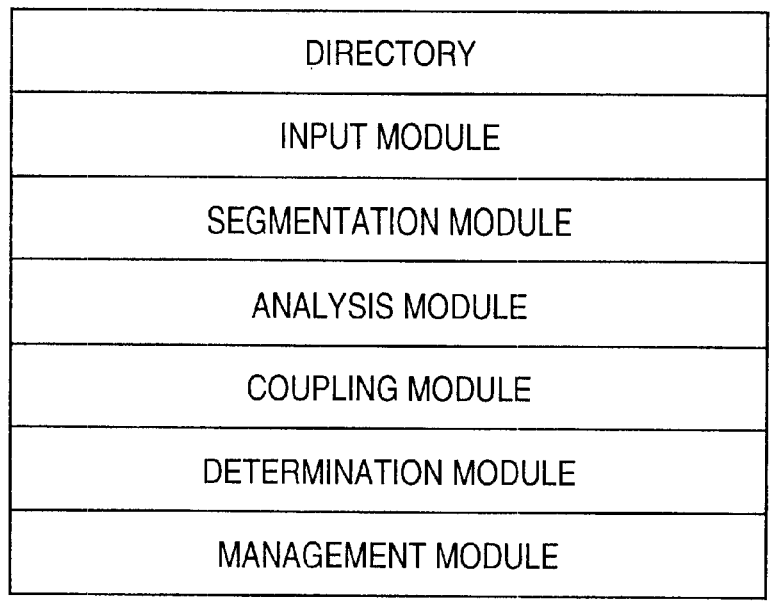
FIG. 6 shows a memory map example of a storage medium that stores various readable data processing programs according to the present invention.

When the present invention is applied to the storage medium, the storage medium stores program codes corresponding to the aforementioned flow charts. Especially, when the flow chart shown in FIG. 2 is executed, modules shown in a memory map example of FIG. 6 are stored in the storage medium.

More specifically, program codes of at least an "input module", "segmentation module", "analysis module", "coupling module", "determination module", and "management module" can be stored in the storage medium.

Of these modules, the "input module" inputs image data. The "segmentation module" segments the input image data into regions with a predetermined size. The "analysis module" analyzes the contents of the segmented regions. The "coupling module" couples neighboring segmented regions if they have the same analysis contents. On the basis of the attribute and position of a region in the neighborhood of a region which is determined to contain characters by analysis, the "determination module" determines the attribute of the region that contains characters to be "caption", when the attribute of a region group obtained after coupling is determined based on the analysis result. The "management module" categorizes the image data into regions in units of attributes on the basis of the analysis and determination results, and manages regions in each category together.

Figure 7:
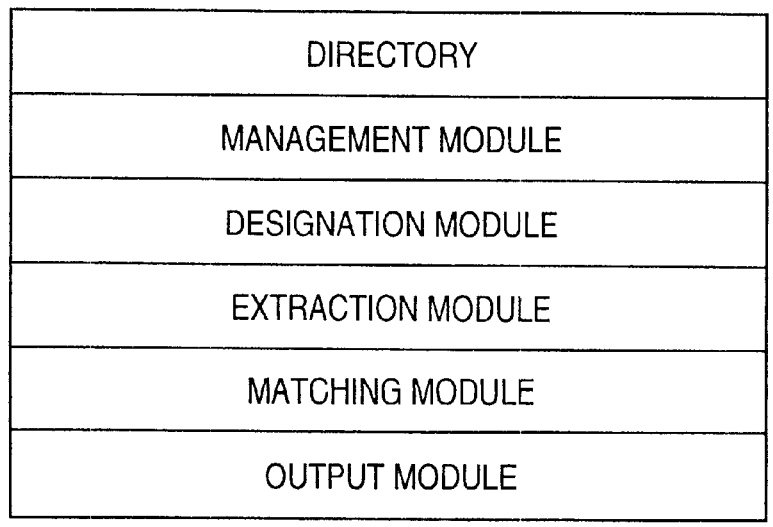
FIG. 7 shows a memory map example of a storage medium that stores various readable data processing programs according to the present invention.

On the other hand, when the flow chart shown in FIG. 3 is executed, modules shown in a memory map example of FIG. 7 are stored in the storage medium.

More specifically, program codes of at least a "management module", "designation module", "extraction module", "matching module", and "output module" can be stored in the storage medium.

Of those modules, the "management module" manages image data while categorizing them into regions in units of attributes. The "designation module" designates a word which serves as a query condition. The "extraction module" extracts a region having a predetermined attribute from the managed image data. The "matching module" matches the designated word with characters in the extracted region. The "output module" outputs image data having the region with the predetermined attribute on the basis of the matching result.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for managing a plurality of image data, comprising:

management means for managing the image data by categorizing the image data into regions in units of attributes;

designation means for designating a word which serves as a retrieve criteria;

extraction means for extracting a region having a predetermined attribute from the image data managed by said management means;

matching means for matching the word designated by said designation means with characters in the region extracted by said extraction means; and output means for outputting image data having the region with the predetermined attribute and another region which is managed in association with the region on the basis of a matching result of said matching means.

2. The apparatus according to claim 1, wherein the predetermined attribute is "caption".

3. An image processing method for managing a plurality of image data, comprising:

managing the image data in a storage medium by categorizing the image data into regions in units of attributes;

designating a word which serves as a retrieve criteria;

extracting a region having a predetermined attribute from the image data managed in the storage medium in the management step;

matching the word designated in the designation step with characters in the region extracted in the extraction step; and outputting image data having the region with the predetermined attribute and another region which is managed in association with the region on the basis of a matching result in the matching step.

4. The method according to claim 3, wherein the predetermined attribute is "caption".

5. A computer readable memory that stores program codes of image processing for managing a plurality of image data, comprising:

code to manage the image data in a storage medium by categorizing the image data into regions in units of attributes;

code to designate a word which serves as a retrieve criteria;

code to extract a region having a predetermined attribute from the image data managed in the storage medium by the management code;

code to match the word designated by the designation code with characters in the region extracted by the extraction code; and code to output image data having the region with the predetermined attribute and another region which is managed in association with the region on the basis of a matching result by the matching code.

* * * * *

UNITED STATES PATENT AND TRADEMARK OFFICE
CERTIFICATE OF CORRECTION

PATENT NO. : 6,510,243 B1
DATED : January 21, 2003
INVENTOR(S) : Ikeda

It is certified that error appears in the above-identified patent and that said Letters Patent is hereby corrected as shown below:

Column 6,
Line 4, "retrive" should read -- retrieve --;
Line 9, "retrived." should read -- retrieved. --;
Lines 29 and 61, "retrive" should read -- retrieve --; and
Line 64, "retrived." should read -- retrieved. --.

Signed and Sealed this

Fourteenth Day of October, 2003

JAMES E. ROGAN
*Director of the United States Patent and Trademark Office*